(12) United States Patent
Yeung et al.

(10) Patent No.: US 11,002,189 B2
(45) Date of Patent: May 11, 2021

(54) MOBILE GAS TURBINE INLET AIR CONDITIONING SYSTEM AND ASSOCIATED METHODS

(71) Applicant: BJ Energy Solutions, LLC, Houston, TX (US)

(72) Inventors: Tony Yeung, Tomball, TX (US); Ricardo Rodriguez-Ramon, Tomball, TX (US)

(73) Assignee: BJ Energy Solutions, LLC, Houston, TX (US)

( * ) Notice: Subject to any disclaimer, the term of this patent is extended or adjusted under 35 U.S.C. 154(b) by 0 days.

(21) Appl. No.: 16/948,289

(22) Filed: Sep. 11, 2020

(65) Prior Publication Data

US 2021/0079841 A1   Mar. 18, 2021

Related U.S. Application Data

(60) Provisional application No. 62/900,291, filed on Sep. 13, 2019, provisional application No. 62/704,565, filed on May 15, 2020.

(51) Int. Cl.
*B01D 46/00* (2006.01)
*F02C 7/143* (2006.01)
(Continued)

(52) U.S. Cl.
CPC ............ *F02C 7/052* (2013.01); *B01D 46/002* (2013.01); *B01D 46/4263* (2013.01); *F02C 6/00* (2013.01);
(Continued)

(58) Field of Classification Search
CPC .............. B01D 46/002; B01D 46/4263; B01D 2279/60; F02C 7/042; F02C 7/052; F02C 6/00
(Continued)

(56) References Cited

U.S. PATENT DOCUMENTS 2,498,229 A   2/1950   Adler
3,191,517 A   6/1965   Solzman
(Continued)

FOREIGN PATENT DOCUMENTS

CA   2876687 A1   5/2014
CA   2693567      9/2014
(Continued)

OTHER PUBLICATIONS

Europump and Hydrualic Institute, Variable Speed Pumping: A Guide to Successful Applications, Elsevier Ltd, 2004.
(Continued)

*Primary Examiner* — Minh Chau T Pham
(74) *Attorney, Agent, or Firm* — Womble Bond Dickinson (US) LLP

(57) ABSTRACT

A system, as well as associated methods, for increasing the efficiency of a gas turbine including an inlet assembly and a compressor may include a housing configured to channel airstream towards the inlet assembly, an air treatment module positioned at a proximal end the housing, and at least one air conditioning module mounted downstream of the air treatment module for adjusting the temperature of the airstream entering the compressor. The air treatment module may include a plurality of inlet air filters and at least one blower configured to pressurize the air entering the air treatment module.

30 Claims, 6 Drawing Sheets

(51) Int. Cl.
    *F02C 7/052*         (2006.01)
    *F02C 6/00*          (2006.01)
    *F02C 7/042*         (2006.01)
    *B01D 46/42*        (2006.01)

(52) U.S. Cl.
    CPC .............. *F02C 7/042* (2013.01); *F02C 7/143* (2013.01); *B01D 2279/60* (2013.01)

(58) Field of Classification Search
    USPC ........ 55/490.1, 410, 385.1, 473, 482.1, 486, 55/505, DIG. 37; 95/273, 8, 10, 14; 96/189
    See application file for complete search history.

(56) References Cited

U.S. PATENT DOCUMENTS

| | | | |
|---|---|---|---|
| 3,257,031 A | 6/1966 | Dietz | |
| 3,378,074 A | 4/1968 | Kiel | |
| 3,739,872 A | 6/1973 | McNair | |
| 3,773,438 A | 11/1973 | Hall et al. | |
| 3,791,682 A | 2/1974 | Mitchell | |
| 3,796,045 A | 3/1974 | Foster | |
| 3,820,922 A | 6/1974 | Buse et al. | |
| 4,010,613 A | 3/1977 | McInerney | |
| 4,031,407 A | 6/1977 | Reed | |
| 4,086,976 A | 5/1978 | Holm et al. | |
| 4,222,229 A | 9/1980 | Uram | |
| 4,269,569 A | 5/1981 | Hoover | |
| 4,311,395 A | 1/1982 | Douthitt et al. | |
| 4,357,027 A | 11/1982 | Zeitlow | |
| 4,402,504 A | 9/1983 | Christian | |
| 4,457,325 A | 7/1984 | Green | |
| 4,470,771 A | 9/1984 | Hall et al. | |
| 4,574,880 A | 3/1986 | Handke | |
| 4,754,607 A | 7/1988 | Mackay | |
| 4,782,244 A | 11/1988 | Wakimoto | |
| 4,796,777 A | 1/1989 | Keller | |
| 4,913,625 A | 4/1990 | Gerlowski | |
| 4,983,259 A | 1/1991 | Duncan | |
| 4,990,058 A | 2/1991 | Eslinger | |
| 5,537,813 A | 7/1996 | Davis et al. | |
| 5,553,514 A | 9/1996 | Walkowc | |
| 5,560,195 A | 10/1996 | Anderson et al. | |
| 5,622,245 A | 4/1997 | Reik | |
| 5,651,400 A | 7/1997 | Corts et al. | |
| 5,678,460 A | 10/1997 | Walkowc | |
| 5,717,172 A | 2/1998 | Griffin, Jr. et al. | |
| 5,983,962 A | 11/1999 | Gerardot | |
| 6,041,856 A | 3/2000 | Thrasher et al. | |
| 6,050,080 A | 4/2000 | Horner | |
| 6,071,188 A | 6/2000 | O'Neill et al. | |
| 6,123,751 A * | 9/2000 | Nelson ................. B01D 46/523 |
| | | | 95/268 |
| 6,129,335 A | 10/2000 | Yokogi | |
| 6,145,318 A | 11/2000 | Kaplan et al. | |
| 6,250,068 B1 * | 6/2001 | Tajima ................... F01D 25/02 |
| | | | 60/803 |
| 6,279,309 B1 | 8/2001 | Lawlor, II et al. | |
| 6,321,860 B1 | 11/2001 | Reddoch | |
| 6,334,746 B1 | 1/2002 | Nguyen et al. | |
| 6,530,224 B1 | 3/2003 | Conchieri | |
| 6,543,395 B2 | 4/2003 | Green | |
| 6,655,922 B1 | 12/2003 | Flek | |
| 6,765,304 B2 | 7/2004 | Baten et al. | |
| 6,786,051 B2 | 9/2004 | Kristich et al. | |
| 6,851,514 B2 | 2/2005 | Han et al. | |
| 6,859,740 B2 | 2/2005 | Stephenson et al. | |
| 6,901,735 B2 | 6/2005 | Lohn | |
| 7,065,953 B1 | 6/2006 | Kopko | |
| 7,222,015 B2 | 5/2007 | Davis et al. | |
| 7,388,303 B2 | 6/2008 | Seiver | |
| 7,545,130 B2 | 6/2009 | Latham | |
| 7,552,903 B2 | 6/2009 | Dunn et al. | |
| 7,563,076 B2 | 7/2009 | Brunet et al. | |
| 7,627,416 B2 | 12/2009 | Batenburg et al. | |
| 7,677,316 B2 | 3/2010 | Butler et al. | |
| 7,721,521 B2 | 5/2010 | Kunkle et al. | |
| 7,730,711 B2 | 6/2010 | Kunkle et al. | |
| 7,845,413 B2 | 12/2010 | Shampine et al. | |
| 7,900,724 B2 | 3/2011 | Promersberger et al. | |
| 7,921,914 B2 | 4/2011 | Bruins et al. | |
| 7,938,151 B2 | 5/2011 | Höckner | |
| 7,980,357 B2 | 7/2011 | Edwards | |
| 8,083,504 B2 | 12/2011 | Williams et al. | |
| 8,186,334 B2 | 5/2012 | Ooyama | |
| 8,196,555 B2 | 6/2012 | Ikeda et al. | |
| 8,316,936 B2 | 11/2012 | Roddy et al. | |
| 8,414,673 B2 * | 4/2013 | Raje ..................... B01D 46/521 |
| | | | 55/410 |
| 8,506,267 B2 | 8/2013 | Gambier et al. | |
| 8,575,873 B2 | 11/2013 | Peterson et al. | |
| 8,616,005 B1 | 12/2013 | Cousino, Sr. et al. | |
| 8,621,873 B2 | 1/2014 | Robertson et al. | |
| 8,672,606 B2 | 3/2014 | Glynn et al. | |
| 8,714,253 B2 | 5/2014 | Sherwood et al. | |
| 8,770,329 B2 | 7/2014 | Spitler | |
| 8,789,601 B2 | 7/2014 | Broussard et al. | |
| 8,794,307 B2 | 8/2014 | Coquilleau et al. | |
| 8,851,441 B2 | 10/2014 | Acuna et al. | |
| 8,905,056 B2 | 12/2014 | Kendrick | |
| 8,973,560 B2 | 3/2015 | Krug | |
| 8,997,904 B2 | 4/2015 | Cryer et al. | |
| 9,032,620 B2 | 5/2015 | Frassinelli et al. | |
| 9,057,247 B2 | 6/2015 | Kumar et al. | |
| 9,103,193 B2 | 8/2015 | Coli et al. | |
| 9,121,257 B2 | 9/2015 | Coli et al. | |
| 9,140,110 B2 | 9/2015 | Coli et al. | |
| 9,187,982 B2 | 11/2015 | Dehring et al. | |
| 9,212,643 B2 | 12/2015 | Deliyski | |
| 9,341,055 B2 | 5/2016 | Weightman et al. | |
| 9,346,662 B2 | 5/2016 | Van Vliet et al. | |
| 9,366,114 B2 | 6/2016 | Coli et al. | |
| 9,376,786 B2 | 6/2016 | Numasawa | |
| 9,394,829 B2 | 7/2016 | Cabeen | |
| 9,395,049 B2 | 7/2016 | Vicknair et al. | |
| 9,401,670 B2 | 7/2016 | Minato et al. | |
| 9,410,410 B2 | 8/2016 | Broussard et al. | |
| 9,410,546 B2 | 8/2016 | Jaeger et al. | |
| 9,429,078 B1 | 8/2016 | Crowe et al. | |
| 9,493,997 B2 | 11/2016 | Liu et al. | |
| 9,512,783 B2 | 12/2016 | Veilleux et al. | |
| 9,534,473 B2 | 1/2017 | Morris et al. | |
| 9,546,652 B2 | 1/2017 | Yin | |
| 9,550,501 B2 | 1/2017 | Ledbetter | |
| 9,556,721 B2 | 1/2017 | Jang et al. | |
| 9,562,420 B2 | 2/2017 | Morris et al. | |
| 9,570,945 B2 | 2/2017 | Fischer | |
| 9,579,980 B2 | 2/2017 | Cryer et al. | |
| 9,587,649 B2 | 3/2017 | Oehring | |
| 9,611,728 B2 | 4/2017 | Oehring | |
| 9,617,808 B2 | 4/2017 | Liu et al. | |
| 9,638,194 B2 | 5/2017 | Wiegman et al. | |
| 9,650,871 B2 | 5/2017 | Oehring et al. | |
| 9,656,762 B2 | 5/2017 | Kamath et al. | |
| 9,689,316 B1 | 6/2017 | Crom | |
| 9,739,130 B2 | 8/2017 | Young | |
| 9,764,266 B1 * | 9/2017 | Carter ................. B01D 46/002 |
| 9,777,748 B2 | 10/2017 | Lu et al. | |
| 9,803,467 B2 | 10/2017 | Tang et al. | |
| 9,803,793 B2 | 10/2017 | Davi et al. | |
| 9,809,308 B2 | 11/2017 | Aguilar et al. | |
| 9,840,897 B2 | 12/2017 | Larson | |
| 9,850,422 B2 | 12/2017 | Lestz et al. | |
| 9,856,131 B1 | 1/2018 | Moffitt | |
| 9,863,279 B2 | 1/2018 | Laing et al. | |
| 9,869,305 B1 | 1/2018 | Crowe et al. | |
| 9,879,609 B1 | 1/2018 | Crowe et al. | |
| 9,893,500 B2 | 2/2018 | Oehring et al. | |
| 9,893,660 B2 | 2/2018 | Peterson et al. | |
| 9,920,615 B2 | 3/2018 | Zhang et al. | |
| 9,945,365 B2 | 4/2018 | Hernandez et al. | |
| 9,964,052 B2 | 5/2018 | Millican et al. | |
| 9,970,278 B2 | 5/2018 | Broussard et al. | |

(56) References Cited

U.S. PATENT DOCUMENTS

| | | |
|---|---|---|
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,018,096 B2 | 7/2018 | Wallimann et al. |
| 10,020,711 B2 | 7/2018 | Oehring et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,349 B2 | 8/2018 | Álvarez et al. |
| 10,082,137 B2 | 9/2018 | Graham et al. |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,134,257 B2 | 11/2018 | Zhang et al. |
| 10,151,244 B2 | 12/2018 | Giancotti et al. |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,303,190 B2 | 5/2019 | Shock |
| 10,316,832 B2 | 6/2019 | Byrne |
| 10,317,875 B2 | 6/2019 | Pandurangan |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,526,882 B2 | 1/2020 | Oehring et al. |
| 10,563,649 B2 | 2/2020 | Zhang et al. |
| 10,577,910 B2 | 3/2020 | Stephenson |
| 10,598,258 B2 | 3/2020 | Oehring et al. |
| 10,610,842 B2 | 4/2020 | Chong |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,865,624 B1 | 12/2020 | Cui et al. |
| 10,865,631 B1 | 12/2020 | Zhang et al. |
| 10,895,202 B1 | 1/2021 | Yeung et al. |
| 10,907,459 B1 | 2/2021 | Yeung et al. |
| 10,954,770 B1 | 3/2021 | Yeung et al. |
| 10,961,908 | 3/2021 | Yeung et al. |
| 10,961,912 | 3/2021 | Yeung et al. |
| 10,961,914 | 3/2021 | Yeung et al. |
| 2004/0016245 A1 | 1/2004 | Pierson |
| 2004/0187950 A1 | 9/2004 | Cohen et al. |
| 2005/0139286 A1 | 6/2005 | Poulter |
| 2005/0226754 A1 | 10/2005 | Orr et al. |
| 2006/0061091 A1 | 3/2006 | Osterloh |
| 2006/0260331 A1 | 11/2006 | Andreychuk |
| 2007/0029090 A1 | 2/2007 | Andreychuk et al. |
| 2007/0066406 A1 | 3/2007 | Keller et al. |
| 2007/0107981 A1 | 5/2007 | Sicotte |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0098891 A1 | 5/2008 | Feher |
| 2008/0161974 A1 | 7/2008 | Alston |
| 2008/0264625 A1 | 10/2008 | Ochoa |
| 2008/0264649 A1 | 10/2008 | Crawford |
| 2009/0064685 A1 | 3/2009 | Busekros et al. |
| 2009/0124191 A1 | 5/2009 | Van Becelaere et al. |
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0052423 A1 | 3/2011 | Gambier et al. |
| 2011/0054704 A1 | 3/2011 | Karpman et al. |
| 2011/0085924 A1 | 4/2011 | Shampine et al. |
| 2011/0197988 A1 | 8/2011 | Van Vliet et al. |
| 2011/0265443 A1 | 11/2011 | Ansari |
| 2011/0272158 A1 | 11/2011 | Neal |
| 2012/0048242 A1 | 3/2012 | Sumilla et al. |
| 2012/0199001 A1* | 8/2012 | Chillar .................. B01D 45/08 95/267 |
| 2012/0310509 A1 | 12/2012 | Pardo et al. |
| 2013/0068307 A1 | 3/2013 | Hains et al. |
| 2013/0087045 A1 | 4/2013 | Sullivan et al. |
| 2013/0087945 A1* | 4/2013 | Kusters .................. G01N 1/36 264/275 |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0013768 A1 | 1/2014 | Laing et al. |
| 2014/0044517 A1* | 2/2014 | Saha ...................... F02C 7/052 415/1 |
| 2014/0048253 A1 | 2/2014 | Andreychuk |
| 2014/0090742 A1 | 4/2014 | Coskrey et al. |
| 2014/0130422 A1 | 5/2014 | Laing et al. |
| 2014/0147291 A1 | 5/2014 | Burnette |
| 2014/0290266 A1 | 10/2014 | Veilleux, Jr. et al. |
| 2014/0318638 A1 | 10/2014 | Harwood et al. |
| 2015/0078924 A1 | 3/2015 | Zhang et al. |
| 2015/0101344 A1* | 4/2015 | Jarrier .................. F02M 35/082 60/796 |
| 2015/0114652 A1 | 4/2015 | Lestz et al. |
| 2015/0135659 A1* | 5/2015 | Jarrier ............ F02M 35/02416 55/378 |
| 2015/0159553 A1* | 6/2015 | Kippel .................. G01N 25/72 374/5 |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0217672 A1 | 8/2015 | Shampine et al. |
| 2015/0275891 A1 | 10/2015 | Chong et al. |
| 2015/0369351 A1 | 12/2015 | Hermann et al. |
| 2016/0102581 A1 | 4/2016 | Del Bono |
| 2016/0105022 A1 | 4/2016 | Oehring et al. |
| 2016/0186671 A1 | 6/2016 | Austin et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0074076 A1 | 3/2017 | Joseph et al. |
| 2017/0082110 A1 | 3/2017 | Lammers |
| 2017/0089189 A1 | 3/2017 | Norris et al. |
| 2017/0145918 A1 | 5/2017 | Oehring et al. |

(56) References Cited

U.S. PATENT DOCUMENTS

| | | |
|---|---|---|
| 2017/0218727 A1 | 8/2017 | Oehring et al. |
| 2017/0226839 A1 | 8/2017 | Broussard et al. |
| 2017/0227002 A1 | 8/2017 | Mikulski et al. |
| 2017/0234165 A1 | 8/2017 | Kersey et al. |
| 2017/0234308 A1 | 8/2017 | Buckley |
| 2017/0248034 A1 | 8/2017 | Dzieciol et al. |
| 2017/0275149 A1 | 9/2017 | Schmidt |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0334448 A1 | 11/2017 | Schwunk |
| 2017/0350471 A1 | 12/2017 | Steidl et al. |
| 2017/0370199 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0058171 A1 | 3/2018 | Roesner et al. |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0223640 A1 | 8/2018 | Keihany |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0063341 A1* | 2/2019 | Davis .................. F02C 7/20 |
| 2019/0067991 A1* | 2/2019 | Davis .................. H02J 3/38 |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0091619 A1* | 3/2019 | Huang .............. B01D 46/0068 |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0131607 A1 | 5/2019 | Gillette |
| 2019/0136677 A1 | 5/2019 | Shampine et al. |
| 2019/0153843 A1 | 5/2019 | Headrick et al. |
| 2019/0154020 A1 | 5/2019 | Glass |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Bolting et al. |
| 2019/0277295 A1 | 9/2019 | Clyburn et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0338762 A1 | 11/2019 | Curry et al. |
| 2019/0345920 A1 | 11/2019 | Surjaatmadja et al. |
| 2019/0353303 A1* | 11/2019 | Morris .................. E21B 43/26 |
| 2019/0356199 A1 | 11/2019 | Morris et al. |
| 2020/0003205 A1 | 1/2020 | Stokkevag et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0088202 A1 | 3/2020 | Sigmar et al. |
| 2020/0095854 A1 | 3/2020 | Hinderliter |
| 2020/0132058 A1 | 4/2020 | Mollatt |
| 2020/0141219 A1 | 5/2020 | Oehring et al. |
| 2020/0141907 A1 | 5/2020 | Meck et al. |
| 2020/0166026 A1 | 5/2020 | Marica |
| 2020/0206704 A1 | 7/2020 | Chong |
| 2020/0224645 A1 | 7/2020 | Buckley |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0392826 A1 | 12/2020 | Cui et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0408071 A1 | 12/2020 | Li et al. |
| 2020/0408144 A1 | 12/2020 | Feng et al. |
| 2020/0408147 A1 | 12/2020 | Zhang et al. |
| 2021/0071574 A1 | 3/2021 | Feng et al. |
| 2021/0071579 A1 | 3/2021 | Li et al. |
| 2021/0071752 A1 | 3/2021 | Cui et al. |

FOREIGN PATENT DOCUMENTS

| | | |
|---|---|---|
| CA | 2876687 C | 4/2019 |
| CN | 2779054 | 5/2006 |
| CN | 2890325 | 4/2007 |
| CN | 200964929 Y | 10/2007 |
| CN | 101323151 A | 12/2008 |
| CN | 201190660 Y | 2/2009 |
| CN | 201190892 Y | 2/2009 |
| CN | 201190893 Y | 2/2009 |
| CN | 101414171 A | 4/2009 |
| CN | 201215073 Y | 4/2009 |
| CN | 201236650 Y | 5/2009 |
| CN | 201275542 Y | 7/2009 |
| CN | 201275801 Y | 7/2009 |
| CN | 201333385 Y | 10/2009 |
| CN | 201443300 U | 4/2010 |
| CN | 201496415 U | 6/2010 |
| CN | 201501365 U | 6/2010 |
| CN | 201507271 U | 6/2010 |
| CN | 101323151 B | 7/2010 |
| CN | 201560210 U | 8/2010 |
| CN | 201581862 U | 9/2010 |
| CN | 201610728 U | 10/2010 |
| CN | 201610751 U | 10/2010 |
| CN | 201618530 U | 11/2010 |

(56) References Cited

FOREIGN PATENT DOCUMENTS

| CN | 201661255 U | 12/2010 |
| CN | 101949382 | 1/2011 |
| CN | 201756927 U | 3/2011 |
| CN | 101414171 B | 5/2011 |
| CN | 102128011 A | 7/2011 |
| CN | 102140898 A | 8/2011 |
| CN | 102155172 A | 8/2011 |
| CN | 202000930 U | 10/2011 |
| CN | 202055781 U | 11/2011 |
| CN | 202082265 U | 12/2011 |
| CN | 202100216 U | 1/2012 |
| CN | 202100217 U | 1/2012 |
| CN | 202100815 U | 1/2012 |
| CN | 202124340 U | 1/2012 |
| CN | 202140051 U | 2/2012 |
| CN | 202140080 U | 2/2012 |
| CN | 202144789 U | 2/2012 |
| CN | 202144943 U | 2/2012 |
| CN | 202149354 U | 2/2012 |
| CN | 102383748 A | 3/2012 |
| CN | 202156297 U | 3/2012 |
| CN | 202158355 U | 3/2012 |
| CN | 202163504 U | 3/2012 |
| CN | 202165236 U | 3/2012 |
| CN | 202180866 U | 4/2012 |
| CN | 202181875 U | 4/2012 |
| CN | 202187744 U | 4/2012 |
| CN | 202191854 U | 4/2012 |
| CN | 202250008 U | 5/2012 |
| CN | 101885307 | 7/2012 |
| CN | 102562020 A | 7/2012 |
| CN | 202326156 U | 7/2012 |
| CN | 202370773 U | 8/2012 |
| CN | 202417397 U | 9/2012 |
| CN | 202417461 U | 9/2012 |
| CN | 102729335 A | 10/2012 |
| CN | 202463955 U | 10/2012 |
| CN | 202463957 U | 10/2012 |
| CN | 202467739 U | 10/2012 |
| CN | 202467801 U | 10/2012 |
| CN | 202531016 U | 11/2012 |
| CN | 202544794 U | 11/2012 |
| CN | 102825039 A | 12/2012 |
| CN | 202578592 U | 12/2012 |
| CN | 202579164 U | 12/2012 |
| CN | 202594808 U | 12/2012 |
| CN | 202594928 U | 12/2012 |
| CN | 202596615 U | 12/2012 |
| CN | 202596616 U | 12/2012 |
| CN | 102849880 A | 1/2013 |
| CN | 102889191 A | 1/2013 |
| CN | 202641535 U | 1/2013 |
| CN | 202645475 U | 1/2013 |
| CN | 202666716 U | 1/2013 |
| CN | 202669645 U | 1/2013 |
| CN | 202669944 U | 1/2013 |
| CN | 202671336 U | 1/2013 |
| CN | 202673269 U | 1/2013 |
| CN | 202751982 U | 2/2013 |
| CN | 102963629 A | 3/2013 |
| CN | 202767964 U | 3/2013 |
| CN | 202789791 U | 3/2013 |
| CN | 202789792 U | 3/2013 |
| CN | 202810717 U | 3/2013 |
| CN | 202827276 U | 3/2013 |
| CN | 202833093 U | 3/2013 |
| CN | 202833370 U | 3/2013 |
| CN | 102140898 B | 4/2013 |
| CN | 202895467 U | 4/2013 |
| CN | 202935798 U | 5/2013 |
| CN | 202935816 U | 5/2013 |
| CN | 202970631 U | 6/2013 |
| CN | 103223315 A | 7/2013 |
| CN | 203050598 U | 7/2013 |
| CN | 103233714 A | 8/2013 |
| CN | 103233715 A | 8/2013 |
| CN | 103245523 A | 8/2013 |
| CN | 103247220 A | 8/2013 |
| CN | 103253839 A | 8/2013 |
| CN | 103277290 A | 9/2013 |
| CN | 103321782 A | 9/2013 |
| CN | 203170270 U | 9/2013 |
| CN | 203172509 U | 9/2013 |
| CN | 203175778 U | 9/2013 |
| CN | 203175787 U | 9/2013 |
| CN | 102849880 B | 10/2013 |
| CN | 203241231 U | 10/2013 |
| CN | 203244941 U | 10/2013 |
| CN | 203244942 U | 10/2013 |
| CN | 203303798 U | 11/2013 |
| CN | 102155172 B | 12/2013 |
| CN | 102729335 B | 12/2013 |
| CN | 103420532 A | 12/2013 |
| CN | 203321792 U | 12/2013 |
| CN | 203412658 | 1/2014 |
| CN | 203420697 U | 2/2014 |
| CN | 203480755 U | 3/2014 |
| CN | 103711437 A | 4/2014 |
| CN | 203531815 U | 4/2014 |
| CN | 203531871 U | 4/2014 |
| CN | 203531883 U | 4/2014 |
| CN | 203556164 U | 4/2014 |
| CN | 203558809 U | 4/2014 |
| CN | 203559861 U | 4/2014 |
| CN | 203559893 U | 4/2014 |
| CN | 203560189 U | 4/2014 |
| CN | 102704870 B | 5/2014 |
| CN | 203611843 U | 5/2014 |
| CN | 203612531 U | 5/2014 |
| CN | 203612843 U | 5/2014 |
| CN | 203614062 U | 5/2014 |
| CN | 203614388 U | 5/2014 |
| CN | 203621045 U | 6/2014 |
| CN | 203621046 U | 6/2014 |
| CN | 203621051 U | 6/2014 |
| CN | 203640993 U | 6/2014 |
| CN | 203655221 U | 6/2014 |
| CN | 103899280 A | 7/2014 |
| CN | 103923670 A | 7/2014 |
| CN | 203685052 U | 7/2014 |
| CN | 203716936 U | 7/2014 |
| CN | 103990410 A | 8/2014 |
| CN | 103993869 A | 8/2014 |
| CN | 203754009 U | 8/2014 |
| CN | 203754025 U | 8/2014 |
| CN | 203754341 U | 8/2014 |
| CN | 203756614 U | 8/2014 |
| CN | 203770264 U | 8/2014 |
| CN | 203784519 U | 8/2014 |
| CN | 203784520 U | 8/2014 |
| CN | 104057864 A | 9/2014 |
| CN | 203819819 U | 9/2014 |
| CN | 203823431 U | 9/2014 |
| CN | 203835337 U | 9/2014 |
| CN | 104074500 A | 10/2014 |
| CN | 203876633 U | 10/2014 |
| CN | 203876636 U | 10/2014 |
| CN | 203877364 U | 10/2014 |
| CN | 203877365 U | 10/2014 |
| CN | 203877375 U | 10/2014 |
| CN | 203877424 U | 10/2014 |
| CN | 203879476 U | 10/2014 |
| CN | 203879479 U | 10/2014 |
| CN | 203890292 U | 10/2014 |
| CN | 203899476 U | 10/2014 |
| CN | 203906206 U | 10/2014 |
| CN | 104150728 A | 11/2014 |
| CN | 104176522 A | 12/2014 |
| CN | 104196464 A | 12/2014 |
| CN | 104234651 A | 12/2014 |
| CN | 203971841 U | 12/2014 |
| CN | 203975450 U | 12/2014 |
| CN | 204020788 U | 12/2014 |
| CN | 204021980 U | 12/2014 |

(56) References Cited

FOREIGN PATENT DOCUMENTS

| | | | |
|---|---|---|---|
| CN | 204024625 U | 12/2014 |
| CN | 204051401 U | 12/2014 |
| CN | 204060661 U | 12/2014 |
| CN | 104260672 A | 1/2015 |
| CN | 104314512 A | 1/2015 |
| CN | 204077478 U | 1/2015 |
| CN | 204077526 U | 1/2015 |
| CN | 204078307 U | 1/2015 |
| CN | 204083051 U | 1/2015 |
| CN | 204113168 U | 1/2015 |
| CN | 104340682 A | 2/2015 |
| CN | 104358536 A | 2/2015 |
| CN | 104369687 A | 2/2015 |
| CN | 104402178 A | 3/2015 |
| CN | 104402185 A | 3/2015 |
| CN | 104402186 A | 3/2015 |
| CN | 204209819 U | 3/2015 |
| CN | 204224560 U | 3/2015 |
| CN | 204225813 U | 3/2015 |
| CN | 204225839 U | 3/2015 |
| CN | 104533392 A | 4/2015 |
| CN | 104563938 A | 4/2015 |
| CN | 104563994 A | 4/2015 |
| CN | 104563995 A | 4/2015 |
| CN | 104563998 A | 4/2015 |
| CN | 104564033 A | 4/2015 |
| CN | 204257122 U | 4/2015 |
| CN | 204283610 U | 4/2015 |
| CN | 204283782 U | 4/2015 |
| CN | 204297682 U | 4/2015 |
| CN | 204299810 U | 4/2015 |
| CN | 103223315 B | 5/2015 |
| CN | 104594857 A | 5/2015 |
| CN | 104595493 A | 5/2015 |
| CN | 104612647 A | 5/2015 |
| CN | 104612928 A | 5/2015 |
| CN | 104632126 A | 5/2015 |
| CN | 204325094 U | 5/2015 |
| CN | 204325098 U | 5/2015 |
| CN | 204326983 U | 5/2015 |
| CN | 204326985 U | 5/2015 |
| CN | 204344040 U | 5/2015 |
| CN | 204344095 U | 5/2015 |
| CN | 104727797 A | 6/2015 |
| CN | 204402414 U | 6/2015 |
| CN | 204402423 U | 6/2015 |
| CN | 204402450 U | 6/2015 |
| CN | 103247220 B | 7/2015 |
| CN | 104803568 A | 7/2015 |
| CN | 204436360 U | 7/2015 |
| CN | 204457524 U | 7/2015 |
| CN | 204472485 U | 7/2015 |
| CN | 204473625 U | 7/2015 |
| CN | 204477303 U | 7/2015 |
| CN | 204493095 U | 7/2015 |
| CN | 204493309 U | 7/2015 |
| CN | 103253839 B | 8/2015 |
| CN | 104820372 A | 8/2015 |
| CN | 104832093 A | 8/2015 |
| CN | 104863523 A | 8/2015 |
| CN | 204552723 U | 8/2015 |
| CN | 204553866 U | 8/2015 |
| CN | 204571831 U | 8/2015 |
| CN | 204703814 U | 10/2015 |
| CN | 204703833 U | 10/2015 |
| CN | 204703834 U | 10/2015 |
| CN | 105092401 A | 11/2015 |
| CN | 103233715 B | 12/2015 |
| CN | 103790927 | 12/2015 |
| CN | 105207097 | 12/2015 |
| CN | 204831952 U | 12/2015 |
| CN | 204899777 U | 12/2015 |
| CN | 102602323 | 1/2016 |
| CN | 105240064 A | 1/2016 |
| CN | 204944834 | 1/2016 |
| CN | 205042127 U | 2/2016 |
| CN | 205172478 U | 4/2016 |
| CN | 103993869 B | 5/2016 |
| CN | 105536299 A | 5/2016 |
| CN | 105545207 A | 5/2016 |
| CN | 205260249 | 5/2016 |
| CN | 103233714 B | 6/2016 |
| CN | 104340682 B | 6/2016 |
| CN | 205297518 U | 6/2016 |
| CN | 205298447 U | 6/2016 |
| CN | 205391821 U | 7/2016 |
| CN | 205400701 U | 7/2016 |
| CN | 103277290 B | 8/2016 |
| CN | 104260672 B | 8/2016 |
| CN | 205477370 U | 8/2016 |
| CN | 205479153 U | 8/2016 |
| CN | 205503058 U | 8/2016 |
| CN | 205503068 U | 8/2016 |
| CN | 205503089 U | 8/2016 |
| CN | 105958098 A | 9/2016 |
| CN | 205599180 | 9/2016 |
| CN | 205599180 U | 9/2016 |
| CN | 106121577 A | 11/2016 |
| CN | 205709587 | 11/2016 |
| CN | 104612928 B | 12/2016 |
| CN | 106246120 A | 12/2016 |
| CN | 205805471 | 12/2016 |
| CN | 106321045 A | 1/2017 |
| CN | 205858306 | 1/2017 |
| CN | 106438310 A | 2/2017 |
| CN | 205937833 | 2/2017 |
| CN | 104563994 B | 3/2017 |
| CN | 206129196 | 4/2017 |
| CN | 104369687 B | 5/2017 |
| CN | 106715165 | 5/2017 |
| CN | 106761561 A | 5/2017 |
| CN | 105240064 B | 6/2017 |
| CN | 206237147 | 6/2017 |
| CN | 206287832 | 6/2017 |
| CN | 206346711 | 7/2017 |
| CN | 104563995 B | 9/2017 |
| CN | 107120822 | 9/2017 |
| CN | 107143298 A | 9/2017 |
| CN | 107159046 A | 9/2017 |
| CN | 107188018 A | 9/2017 |
| CN | 206496016 | 9/2017 |
| CN | 104564033 B | 10/2017 |
| CN | 107234358 A | 10/2017 |
| CN | 107261975 A | 10/2017 |
| CN | 206581929 | 10/2017 |
| CN | 104820372 B | 12/2017 |
| CN | 105092401 B | 12/2017 |
| CN | 107476769 A | 12/2017 |
| CN | 107520526 A | 12/2017 |
| CN | 206754664 | 12/2017 |
| CN | 107605427 A | 1/2018 |
| CN | 106438310 B | 2/2018 |
| CN | 107654196 A | 2/2018 |
| CN | 107656499 A | 2/2018 |
| CN | 107728657 A | 2/2018 |
| CN | 206985503 | 2/2018 |
| CN | 207017968 | 2/2018 |
| CN | 107859053 A | 3/2018 |
| CN | 207057867 | 3/2018 |
| CN | 207085817 | 3/2018 |
| CN | 105545207 B | 4/2018 |
| CN | 107883091 A | 4/2018 |
| CN | 107902427 A | 4/2018 |
| CN | 107939290 A | 4/2018 |
| CN | 107956708 | 4/2018 |
| CN | 207169595 | 4/2018 |
| CN | 207194873 | 4/2018 |
| CN | 207245674 | 4/2018 |
| CN | 108034466 A | 5/2018 |
| CN | 108036071 A | 5/2018 |
| CN | 108087050 A | 5/2018 |
| CN | 207380566 | 5/2018 |
| CN | 108103483 A | 6/2018 |
| CN | 108179046 A | 6/2018 |

(56) References Cited

FOREIGN PATENT DOCUMENTS

| | | | |
|---|---|---|---|
| CN | 108254276 A | 7/2018 |
| CN | 108311535 A | 7/2018 |
| CN | 207583576 | 7/2018 |
| CN | 207634064 | 7/2018 |
| CN | 207648054 | 7/2018 |
| CN | 207650621 | 7/2018 |
| CN | 108371894 A | 8/2018 |
| CN | 207777153 | 8/2018 |
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |
| CN | 108590617 A | 9/2018 |
| CN | 207813495 | 9/2018 |
| CN | 207814698 | 9/2018 |
| CN | 207862275 | 9/2018 |
| CN | 108687954 A | 10/2018 |
| CN | 207935270 | 10/2018 |
| CN | 207961582 | 10/2018 |
| CN | 207964530 | 10/2018 |
| CN | 108789848 A | 11/2018 |
| CN | 108868675 A | 11/2018 |
| CN | 208086829 | 11/2018 |
| CN | 208089263 | 11/2018 |
| CN | 108979569 A | 12/2018 |
| CN | 109027662 A | 12/2018 |
| CN | 109058092 A | 12/2018 |
| CN | 208179454 | 12/2018 |
| CN | 208179502 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |
| CN | 110374745 A | 10/2019 |
| CN | 209534736 | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 | 11/2019 |
| CN | 209653968 | 11/2019 |
| CN | 209654004 | 11/2019 |
| CN | 209654022 | 11/2019 |
| CN | 209654128 | 11/2019 |
| CN | 209656622 | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 | 12/2019 |
| CN | 209780827 | 12/2019 |
| CN | 209798631 | 12/2019 |
| CN | 209799942 | 12/2019 |
| CN | 209800178 | 12/2019 |
| CN | 209855723 | 12/2019 |
| CN | 209855742 | 12/2019 |
| CN | 209875063 | 12/2019 |
| CN | 110656919 A | 1/2020 |
| CN | 107520526 B | 2/2020 |
| CN | 110787667 A | 2/2020 |
| CN | 110821464 A | 2/2020 |
| CN | 110833665 A | 2/2020 |
| CN | 110848028 A | 2/2020 |
| CN | 210049880 | 2/2020 |
| CN | 210049882 | 2/2020 |
| CN | 210097596 | 2/2020 |
| CN | 210105817 | 2/2020 |
| CN | 210105818 | 2/2020 |
| CN | 210105993 | 2/2020 |
| CN | 110873093 A | 3/2020 |
| CN | 210139911 | 3/2020 |
| CN | 110947681 A | 4/2020 |
| CN | 111058810 A | 4/2020 |
| CN | 111075391 A | 4/2020 |
| CN | 210289931 | 4/2020 |
| CN | 210289932 | 4/2020 |
| CN | 210289933 | 4/2020 |
| CN | 210303516 | 4/2020 |
| CN | 211412945 | 4/2020 |
| CN | 111089003 | 5/2020 |
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |

(56) References Cited

FOREIGN PATENT DOCUMENTS

| | | |
|---|---|---|
| CN | 111206901 A | 5/2020 |
| CN | 111206992 A | 5/2020 |
| CN | 111206994 A | 5/2020 |
| CN | 210449044 | 5/2020 |
| CN | 210460875 | 5/2020 |
| CN | 210522432 | 5/2020 |
| CN | 210598943 | 5/2020 |
| CN | 210598945 | 5/2020 |
| CN | 210598946 | 5/2020 |
| CN | 210599194 | 5/2020 |
| CN | 210599303 | 5/2020 |
| CN | 210600110 | 5/2020 |
| CN | 111219326 A | 6/2020 |
| CN | 111350595 A | 6/2020 |
| CN | 210660319 | 6/2020 |
| CN | 210714569 | 6/2020 |
| CN | 210769168 | 6/2020 |
| CN | 210769169 | 6/2020 |
| CN | 210769170 | 6/2020 |
| CN | 210770133 | 6/2020 |
| CN | 210825844 | 6/2020 |
| CN | 210888904 | 6/2020 |
| CN | 210888905 | 6/2020 |
| CN | 210889242 | 6/2020 |
| CN | 111397474 A | 7/2020 |
| CN | 111412064 A | 7/2020 |
| CN | 111441923 A | 7/2020 |
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 | 8/2020 |
| CN | 211201920 | 8/2020 |
| CN | 211202218 | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |
| CN | 211384571 | 9/2020 |
| CN | 211397553 | 9/2020 |
| CN | 211397677 | 9/2020 |
| CN | 211500955 | 9/2020 |
| CN | 211524765 | 9/2020 |
| DE | 4241614 | 6/1994 |
| DE | 102012018825 | 3/2014 |
| EP | 0835983 | 4/1998 |
| EP | 1378683 | 1/2004 |
| EP | 2143916 | 1/2010 |
| EP | 2613023 | 7/2013 |
| EP | 3095989 | 11/2016 |
| EP | 3211766 | 8/2017 |
| EP | 3354866 | 8/2018 |
| GB | 1438172 | 6/1976 |
| JP | S57135212 | 2/1984 |
| KR | 20020026398 | 4/2002 |
| RU | 13562 | 4/2000 |
| WO | 1993020328 | 10/1993 |
| WO | 2006025886 | 3/2006 |
| WO | 2009023042 | 2/2009 |
| WO | 2012139380 | 10/2012 |
| WO | 2013185399 | 12/2013 |
| WO | 2015158020 | 10/2015 |
| WO | 2016033983 | 3/2016 |
| WO | 2016078181 | 5/2016 |
| WO | 2016101374 | 6/2016 |
| WO | 2016112590 | 7/2016 |
| WO | 2017213848 | 12/2017 |
| WO | 2018031029 | 2/2018 |
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018156131 | 8/2018 |
| WO | 2018075034 | 10/2018 |
| WO | 2018187346 | 10/2018 |
| WO | 2018031031 | 2/2019 |
| WO | 2019045691 | 3/2019 |
| WO | 2019060922 | 3/2019 |
| WO | 2019126742 | 6/2019 |
| WO | 2019147601 | 8/2019 |
| WO | 2019169366 | 9/2019 |
| WO | 2019200510 | 10/2019 |
| WO | 2019210417 | 11/2019 |
| WO | 2020018068 | 1/2020 |
| WO | 2020072076 | 4/2020 |
| WO | 2020104088 | 5/2020 |
| WO | 2020131085 A1 | 6/2020 |
| WO | 2020211083 | 10/2020 |
| WO | 2020211086 | 10/2020 |

OTHER PUBLICATIONS

Capstone Turbine Corporation, Capstone Receives Three Megawatt Order from Large Independent Oil & Gas Company in Eagle Ford Shale Play, Dec. 7, 2010.

Wikipedia, Westinghouse Combustion Turbine Systems Division, https://en.wikipedia.org/wiki/Westinghouse_Combustion_Turbine_Systems_Division, circa 1960.

Wikipedia, Union Pacific GTELs, https://en.wikipedia.org/wiki/Union_Pacific_GTELs, circa 1950.

HCI JET Frac, Screenshots from YouTube, Dec. 11, 2010. https://www.youtube.com/watch?v=6HjXkdbFaFQ.

AFD Petroleum Ltd., Automated Hot Zone, Frac Refueling System, Dec. 2018.

Eygun, Christiane, et al., URTeC: 2687987, Mitigating Shale Gas Developments Carbon Footprint: Evaluating and Implementing Solutions in Argentina, Copyright 2017, Unconventional Resources Technology Conference.

Walzel, Brian, Hart Energy, Oil, Gas Industry Discovers Innovative Solutions to Environmental Concerns, Dec. 10, 2018.

Frac Shack, Bi-Fuel FracFueller brochure, 2011.

Pettigrew, Dana, et al., High Pressure Multi-Stage Centrifugal Pump for 10,000 psi Frac Pump—HPHPS FRAC Pump, Copyright 2013, Society of Petroleum Engineers, SPE 166191.

Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.

Wallace, E.M., Associated Shale Gas: From Flares to Rig Power, Copyright 2015, Society of Petroleum Engineers, SPE-173491-MS.

Williams, C.W. (Gulf Oil Corp. Odessa Texas), The Use of Gas-turbine Engines in an Automated High-Pressure Water-Injection Stations; American Petroleum Institute; API-63-144 (Jan. 1, 1963).

Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).

Porter, John A. (SOLAR Division International Harvester Co.), Modern Industrial Gas Turbines for the Oil Field; American Petroleum Institute; Drilling and Production Practice; API-67-243 (Jan. 1, 1967).

Cooper et al., Jet Frac Porta-Skid—A New Concept in Oil Field Service Pump Equipments[sic]; Halliburton Services; SPE-2706 (1969).

Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).

(56) References Cited

OTHER PUBLICATIONS

Kas'yanov et al., Application of gas-turbine engines in pumping units complexes of hydraulic fracturing of oil and gas reservoirs; Exposition Oil & Gas; (Oct. 2012) (published in Russian).

AFGlobal Corporation, Durastim Hydraulic Fracturing Pump, A Revolutionary Design for Continuous Duty Hydraulic Fracturing, 2018.

ResearchGate, Answer by Byron Woolridge, found at https://www.researchgate.net/post/How_can_we_improve_the_effifiency_of_the_gas_turbine_cycles, Jan. 1, 2013.

Filipović, Ivan, Preliminary Selection of Basic Parameters of Different Torsional Vibration Dampers Intended for use in Medium-Speed Diesel Engines, Transactions of Famena XXXVI-3 (2012).

Marine Turbine Technologies, 1 MW Power Generation Package, http://marineturbine.com/power-generation, 2017.

Business Week: Fiber-optic cables help fracking, cablinginstall.com. Jul. 12, 2013. https://www.cablinginstall.com/cable/article/16474208/businessweek-fiberoptic-cables-help-fracking.

Fracking companies switch to electric motors to power pumps, iadd-intl.org. Jun. 27, 2019. https://www.iadd-intl.org/articles/fracking-companies-switch-to-electric-motors-to-power-pumps/.

The Leader in Frac Fueling, suncoastresources.com. Jun. 29, 2015. https://web.archive.org/web/20150629220609/https://www.suncoastresources.com/oilfield/fueling-services/.

Mobile Fuel Delivery, atlasoil.com. Mar. 6, 2019. https://www.atlasoil.com/nationwide-fueling/onsite-and-mobile-fueling.

Frac Tank Hose (FRAC), 4starhose.com. Accessed: Nov. 10, 2019. http://www.4starhose.com/product/frac_tank_hose_frac.aspx.

PLOS ONE, Dynamic Behavior of Reciprocating Plunger Pump Discharge Valve Based on Fluid Structure Interaction and Experimental Analysis. Oct. 21, 2015.

FMC Technologies, Operation and Maintenance Manual, L06 Through L16 Triplex Pumps Doc No. OMM50000903 Rev: E p. 1 of 66. Aug. 27, 2009.

Gardner Denver Hydraulic Fracturing Pumps GD 3000 https://www.gardnerdenver.com/en-us/pumps/triplextracking-pump-gd-3000.

Lekontsev, Yu M., et al. "Two-side sealer operation." Journal of Mining Science 49.5 (2013): 757-762.

Tom Hausfeld, GE Power & Water, and Eldon Schelske, Evolution Well Services, TM2500+ Power for Hydraulic Fracturing.

FTS International's Dual Fuel Hydraulic Fracturing Equipment Increases Operational Efficiencies, Provides Cost Benefits, Jan. 3, 2018.

CNG Delivery, Fracturing with natural gas, dual-fuel drilling with CNG, Aug. 22, 2019.

PbNG, Natural Gas Fuel for Drilling and Hydraulic Fracturing, Diesel Displacement / Dual Fuel & Bi-Fuel, May 2014.

Integrated Flow, Skid-mounted Modular Process Systems, https://ifsolutions.com/.

Cameron, A Schlumberger Company, Frac Manifold Systems, 2016.

ZSi-Foster, Energy | Solar | Fracking | Oil and Gas, https://www.zsi-fostercom/energy-solar-fracking-oil-and-gas.html.

JBG Enterprises, Inc., WS-Series Blowout Prevention Safety Coupling—Quick Release Couplings, http://www.jgbhose.com/products/WS-Series-Blowout-Prevention-Safety-Coupling.asp.

Halliburton, Vessel-based Modular Solution (VMS), 2015.

Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.

Wolf, Jürgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.

Ginter, Timothy, and Thomas Bouvay. "Uprate options for the MS7001 heavy duty gas turbine." GE paper GER-3808C, GE Energy 12 (2006).

Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.

Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.

II-VI Marlow Industries, Thermoelectric Technologies in Oil, Gas, and Mining Industries, blog.marlow.com (Jul. 24, 2019).

B.M. Mahlalela, et al., .Electric Power Generation Potential Based on Waste Heat and Geothermal Resources in South Africa, pangea.stanford.edu (Feb. 11, 2019).

Department of Energy, United States of America, The Water-Energy Nexus: Challenges and Opportunities purenergypolicy.org (Jun. 2014).

Ankit Tiwari, Design of a Cooling System for a Hydraulic Fracturing Equipment, The Pennsylvania State University, The Graduate School, College of Engineering, 2015.

Jp Yadav et al., Power Enhancement of Gas Turbine Plant by Intake Air Fog Cooling, Jun. 2015.

Mee Industries: Inlet Air Fogging Systems for Oil, Gas and Petrochemical Processing, Verdict Media Limited Copyright 2020.

M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.

Advances in Popular Torque-Link Solution Offer OEMs Greater Benefit, Jun. 21, 2018.

Emmanuel Akita et al., Mewbourne College of Earth & Energy, Society of Petroleum Engineers; Drilling Systems Automation Technical Section (DSATS); 2019.

PowerShelter Kit II, nooutage.com, Sep. 6, 2019.

EMPengineering.com, HEMP Resistant Electrical Generators / Hardened Structures HEMP/GMD Shielded Generators, Virginia.

Blago Minovski, Coupled Simulations of Cooling and Engine Systems for Unsteady Analysis of the Benefits of Thermal Engine Encapsulation, Department of Applied Mechanics, Chalmers University of Technology Goteborg, Sweden 2015.

J. Porteiro et al., Feasibility of a new domestic CHP trigeneration with heat pump: II. Availability analysis. Design and development, Applied Thermal Engineering 24 (2004) 1421-1429.

\* cited by examiner

| Alt. (ft) | Temp (F) | Pressure at 59F (inH2O) | Density at 59F (lbm/ft3) | Density at 65F (lbm/ft3) | Density at 75F (lbm/ft3) | Density at 85F (lbm/ft3) | Density at 90F (lbm/ft3) | Density at 100F (lbm/ft3) |
|---|---|---|---|---|---|---|---|---|
| 0 | 59.0 | 407.2 | 0.0765 | 0.0756 | 0.0742 | 0.0728 | 0.0722 | 0.0709 |
| 500 | 57.2 | 399.9 | 0.0754 | 0.0743 | 0.0729 | 0.0715 | 0.0709 | 0.0696 |
| 1000 | 55.4 | 392.7 | 0.0743 | 0.0729 | 0.0716 | 0.0703 | 0.0696 | 0.0684 |
| 2000 | 51.9 | 378.6 | 0.0721 | 0.0703 | 0.0690 | 0.0677 | 0.0671 | 0.0659 |
| 3000 | 48.3 | 364.9 | 0.0700 | 0.0678 | 0.0665 | 0.0653 | 0.0647 | 0.0635 |
| 4000 | 44.7 | 351.7 | 0.0679 | 0.0653 | 0.0641 | 0.0629 | 0.0623 | 0.0612 |
| 5000 | 41.2 | 338.8 | 0.0659 | 0.0629 | 0.0617 | 0.0606 | 0.0601 | 0.0590 |

FIG. 4

MOBILE GAS TURBINE INLET AIR CONDITIONING SYSTEM AND ASSOCIATED METHODS

PRIORITY CLAIMS

This U.S. non-provisional patent application claims priority to and the benefit of, under 35 U.S.C. § 119(e), U.S. Provisional Application No. 62/900,291, filed Sep. 13, 2019, and U.S. Provisional Application No. 62/704,565, filed May 15, 2020, the disclosures of both of which are incorporated herein by reference in their entireties.

TECHNICAL FIELD

In one aspect, the present disclosure relates to a gas turbine and, more particularly, to systems and method for increasing the efficiency of the gas turbine.

BACKGROUND

The present disclosure relates generally to a turbine such as, but not limiting of, a gas turbine, a bi-fuel turbine, and the like, and may generally include, in serial flow arrangement, an inlet assembly for receiving and channeling an ambient airstream, a compressor which receives and compresses that airstream, a combusting system that mixes a fuel and the compressed airstream, ignites the mixture, and allows for the gaseous by-product to flow to a turbine section, which transfers energy from the gaseous by-product to an output power.

For example, a gas turbine engine may be used to supply power to a hydraulic fracturing system. Hydraulic fracturing is an oilfield operation that stimulates production of hydrocarbons, such that the hydrocarbons may more easily or readily flow from a subsurface formation to a well. For example, a fracturing system may be configured to fracture a formation by pumping a fracturing fluid into a well at high pressure and high flow rates. Some fracturing fluids may take the form of a slurry including water, proppants, and/or other additives, such as thickening agents and/or gels. The slurry may be forced via one or more pumps into the formation at rates faster than can be accepted by the existing pores, fractures, faults, or other spaces within the formation. As a result, pressure may build rapidly to the point where the formation may fail and may begin to fracture, thereby releasing the load on the pumps. By continuing to pump the fracturing fluid into the formation, existing fractures in the formation are caused to expand and extend in directions farther away from a well bore, thereby creating flow paths to the well bore. The proppants may serve to prevent the expanded fractures from closing when pumping of the fracturing fluid is ceased or may reduce the extent to which the expanded fractures contract when pumping of the fracturing fluid is ceased.

Gas turbine engines may be used to supply power to hydraulic fracturing pumps for pumping the fracturing fluid into the formation. For example, a plurality of gas turbine engines may each be mechanically connected to a corresponding hydraulic fracturing pump via a transmission and operated to drive the hydraulic fracturing pump. The gas turbine engine, hydraulic fracturing pump, transmission, and auxiliary components associated with the gas turbine engine, hydraulic fracturing pump, and transmission may be connected to a common platform or trailer for transportation and set-up as a hydraulic fracturing unit at the site of a fracturing operation, which may include up to a dozen or more of such hydraulic fracturing units operating together to perform the fracturing operation. Once a fracturing operation has been completed, the hydraulic fracturing units may be transported to another geographic location to perform another fracturing operation.

Hydraulic fracturing may be performed generally at any geographic location and during any season of the year, often in harsh environmental conditions. As a result, hydraulic fracturing may occur under a wide variety of ambient temperatures and pressures, depending on the location and time of year. In addition, the load on the hydraulic fracturing pumps and thus the gas turbine engines may change or fluctuate greatly, for example, depending on the build-up and release of pressure in the formation being fractured.

The performance of a gas turbine engine is dependent on the conditions under which the gas turbine engine operates. For example, ambient air pressure and temperature are large factors in the output of the gas turbine engine, with low ambient air pressure and high ambient temperature reducing the maximum output of the gas turbine engine. Low ambient pressure and/or high ambient temperature reduce the density of air, which reduces the mass flow of the air supplied to the intake of the gas turbine engine for combustion, which results in a lower power output. Some environments in which hydraulic fracturing operations occur are prone to low ambient pressure, for example, at higher elevations, and/or higher temperatures, for example, in hot climates. In addition, gas turbine engines are subject to damage by particulates in air supplied to the intake. Thus, in dusty environments, such as at many well sites, the air must be filtered before entering the intake of the gas turbine engine. However, filtration may reduce the pressure of air supplied to the intake, particularly as the filter medium of the filter becomes obstructed by filtered particulates with use. Reduced power output of the gas turbine engines reduces the pressure and/or flow rate provided by the corresponding hydraulic fracturing pumps of the hydraulic fracturing units. Thus, the effectiveness of a hydraulic fracturing operation may be compromised by reduced power output of the gas turbine engines of the hydraulic fracturing operation.

To generate additional power from an existing gas turbine, an inlet air conditioning system may be used. The air conditioning system may increase the airstream density by lowering the temperature of the airstream. This increases the mass flowrate of air entering the compressor, resulting in increased efficiency and power output of the gas turbine. An air conditioning system may include, for example, but not limited to, a chiller, an evaporative cooler, a spray cooler, or combinations thereof, located downstream of an inlet filter house within an inlet assembly of the gas turbine. Some air conditioning systems, however, add resistance to the airstream entering the compressor. This resistance may cause a pressure drop in the inlet assembly. Reduced gas turbine efficiency and power output may result from inlet assembly pressure drop.

The higher the inlet assembly pressure drop, the lower the efficiency and power output of the gas turbine. Typical pressure drop values across the gas turbine inlet assembly for power generation varies from about two (2) to about five (5) inches of water column (about five to about 12.7 centimeters of water). This includes the pressure drop across the air conditioning system, which varies from about 0.5 inches to about 1.5 inches of water column (about 1.27 to about 3.8 centimeters of water). Depending on the size of the gas turbine frame, the value of this pressure drop adversely affects the gas turbine output. For example, a gas turbine could lose up to 5% of rated output power from the pressure drop alone if the altitude and temperature remained at ISO conditions. Any change in temperature and/or pressure from ISO rated conditions could increase the rated output power loss. Every point of efficiency and power, however, is essential in the competitive business of power generation or the variety of other uses for mechanical drive gas turbines.

Accordingly, Applicant has recognized a need for an air condition system for an operating a gas turbine, for example, in a wide variety of ambient conditions and during changing loads on the gas turbine. Desirably, the system should reduce the inlet assembly pressure drop when not in operation.

SUMMARY

As referenced above, a gas turbine may be used to supply power in a wide variety of locations and may be operated during any time of the year, sometimes resulting in operation in harsh environments, for example, when used to supply power to a hydraulic fracturing system. In addition, a gas turbine may be subjected to a fluctuating load during operation, for example, when used to supply power to a hydraulic fracturing system.

The present disclosure is generally directed to systems and methods for increasing the efficiency of operation of a gas turbine, for example, during operation in a wide variety of ambient conditions and/or under fluctuating loads. In some embodiments, a system for increasing the efficiency of a conventional gas turbine having an inlet assembly and a compressor, the inlet assembly being located upstream of the compressor, may include a housing, an air treatment module, and at least one air conditioning module. As contemplated and discussed above, performance losses may be expected at increased temperatures, increased altitude, and/or increased humidity when using a dual fuel turbine system in a mobile application that is configured to drive a reciprocating hydraulic fracturing pump or drive a generator as part of a gen-set. These environmental conditions may lead to the air being less dense, which may adversely affect turbine system performance as the turbine mass air flow through the air intake axial compression stages are directly proportional to the turbines performance output. The air treatment module may include one or more air conditioning modules that may condition input air to effect a desired increase in the mass flow of air through the air intake axial compression stages of the turbine.

According to some embodiments, the housing may be configured to channel an airstream towards the inlet assembly, the housing being positioned upstream of the inlet assembly, which channels the airstream to the compressor. The air treatment module may be positioned at a proximal end of the housing and may include a plurality of inlet air filters and at least one blower in fluid communication with an interior of the housing and configured to pressurize air entering the air treatment module. The at least one conditioning module may be mounted downstream of the air treatment module and may be configured to adjust the temperature of the airstream entering the compressor, such that the airstream enters the air conditioning module at a first temperature and exits the air conditioning module at a second temperature.

According to some embodiments, a hydraulic fracturing unit may include a trailer, and a hydraulic fracturing pump to pump fracturing fluid into a wellhead, with the hydraulic fracturing pump connected to the trailer. The hydraulic fracturing unit also may include a gas turbine to drive the hydraulic fracturing pump, and an air treatment system to increase the efficiency of the gas turbine, the gas turbine including an inlet assembly and a compressor. The air treatment system may include a housing positioned to channel an airstream towards the inlet assembly, and an air treatment module positioned at a proximal end of the housing. The air treatment module may include a plurality of inlet air filters to provide fluid flow to a first internal chamber, and one or more blowers mounted in the first internal chamber and providing fluid flow to an interior of the housing via at least one outlet of the first internal chamber, the one or more blowers positioned to pressurize air entering the air treatment module. The air treatment module further may include one or more air conditioning modules mounted downstream of the air treatment module to adjust the temperature of the airstream entering the compressor, such that the airstream enters the one or more air conditioning modules at a first temperature and exits the one or more air conditioning modules at a second temperature.

According to some embodiments, a method to enhance the efficiency of a gas turbine including an inlet assembly and a compressor may include causing an airstream to flow toward the inlet assembly and passing the airstream through a plurality of inlet air filters to a first internal chamber. The method also may include operating one or more blowers to pressurize the airstream and provide fluid flow to an interior of a housing via at least one outlet of the first internal chamber. The method further may include causing the airstream to enter one or more air conditioning modules at a first temperature and exit the one or more air conditioning modules at a second temperature.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced. According to common practice, the various features of the drawings discussed below are not necessarily drawn to scale. Dimensions of various features and elements in the drawings may be expanded or reduced to more clearly illustrate the embodiments of the disclosure.

FIG. 4 illustrates, in table form, air properties at different elevations and temperatures according to an embodiment of the disclosure.

DETAILED DESCRIPTION

Figure 1:
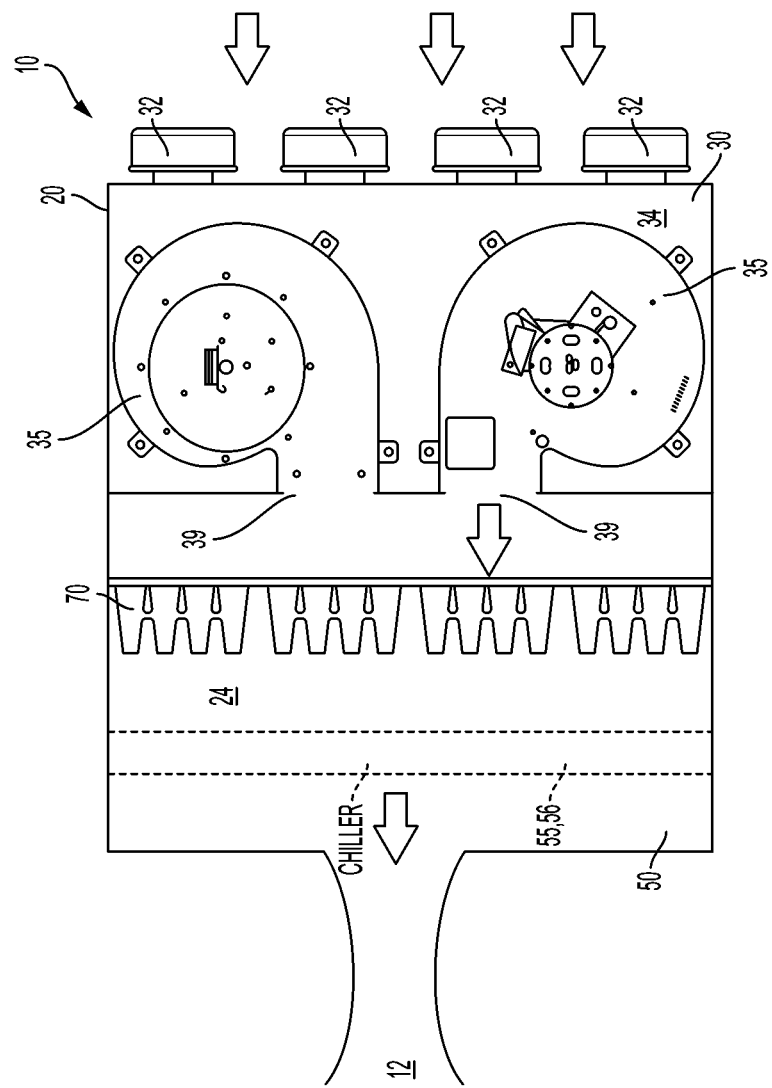
FIG. 1 is a schematic diagram of an embodiment of an air treatment system for increasing the efficiency of a gas turbine according to an embodiment of the disclosure.

Referring now to the drawings in which like numerals indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described may be obtained by selecting some of the features of the embodiments without utilizing other features. Accordingly, those skilled in the art will recognize that many modifications and adaptations to the embodiments described are possible and may even be desirable in certain circumstances, and are a part of the disclosure. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Figure 2:
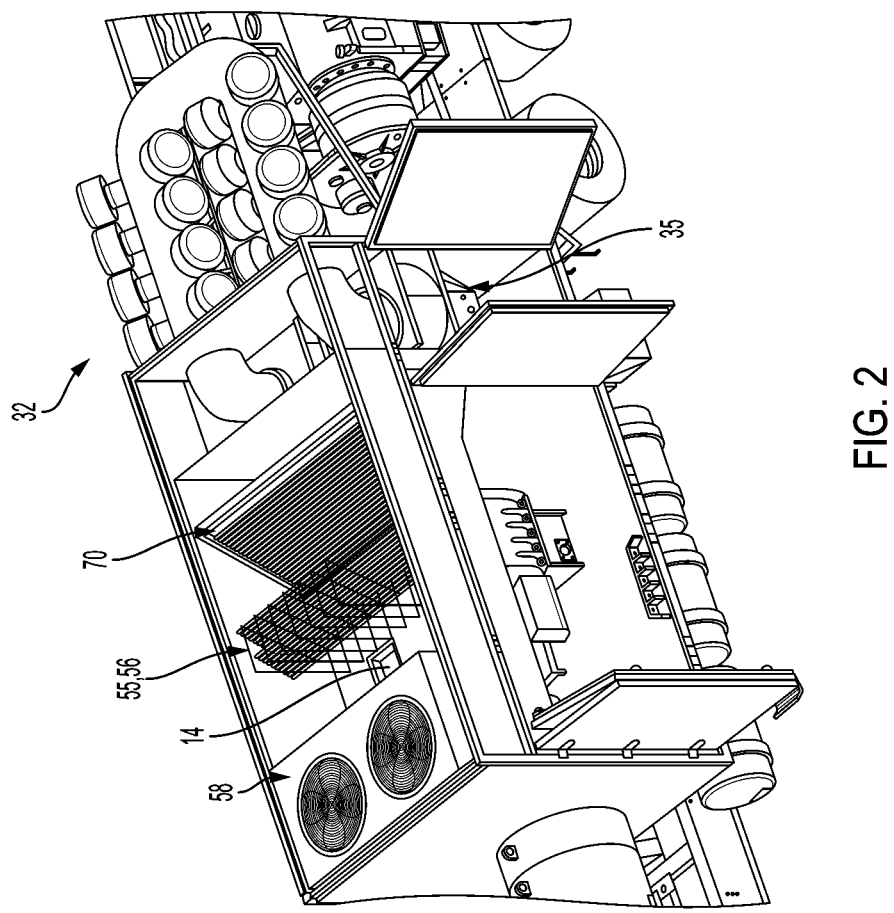
FIG. 2 shows an exemplary system setup of the air conditioning system according to an embodiment of the disclosure.

Referring to FIGS. 1 and 2, an example air treatment system 10 is described for operation with a gas turbine 12. Such a gas turbine may generally include, in serial flow arrangement, an inlet assembly including an inlet 14 for receiving and channeling an ambient airstream, a compressor which receives and compresses that airstream, a combusting system that mixes a fuel and the compressed airstream, ignites the mixture, and allows for the gaseous by-product to flow to a turbine section, which transfers energy from the gaseous by-product to an output power. Other components of the gas turbine may be used therein as will be understood by those skilled in the art.

In some embodiments, the air treatment system 10 may be incorporated into a hydraulic fracturing unit. For example, a hydraulic fracturing unit may include a trailer and a hydraulic fracturing pump to pump fracturing fluid into a wellhead, with the hydraulic fracturing pump connected to the trailer. The hydraulic fracturing unit also may include a gas turbine to drive the hydraulic fracturing pump, for example, via a gearbox, and the air treatment system 10, in some embodiments, may be used to increase the efficiency of the gas turbine. Hydraulic fracturing may be performed generally at any geographic location and during any season of the year, often in harsh environmental conditions. As a result, hydraulic fracturing may occur under a wide variety of ambient temperatures and pressures, depending on the location and time of year. In addition, the load on the hydraulic fracturing pumps and thus the gas turbine engines may change or fluctuate greatly, for example, depending on the build-up and release of pressure in the formation being fractured. In some embodiments, the air treatment system 10 may be configured to increase the efficiency of operation of a gas turbine, for example, during operation in a wide variety of ambient conditions and/or under fluctuating loads. As referenced above, performance losses may be expected at increased temperatures, increased altitude, and/or increased humidity when using a dual fuel turbine system for a mobile hydraulic fracturing unit configured to drive a reciprocating hydraulic fracturing pump via a gearbox or drive a generator as part of a gen-set. These environmental conditions may lead to the air being less dense, which may adversely affect turbine system performance as the turbine mass air flow through the air intake axial compression stages are directly proportional to the turbines performance output. In some embodiments, the air treatment system 10 may include one or more air conditioning modules that may condition input air to effect a desired increase in the mass flow of air through the air intake axial compression stages of the gas turbine, thereby at least partially mitigating or overcoming any performance losses of the gas turbine of a hydraulic fracturing unit due to increased temperatures, increased altitude, and/or increased humidity, while being able to respond to fluctuating loads.

In some embodiments, the air treatment system 10 may include a housing 20, an air treatment module 30, and/or at least one air conditioning module 50. Optionally, the air treatment system 10 may further include a filter module 70 positioned intermediate the at least one conditioning module 50 and the input side of the gas turbine. As contemplated and discussed above, performance losses may be expected at increased temperatures, increased altitude, and/or increased humidity, for example, when using a dual fuel turbine system in a mobile application that is configured to drive a reciprocating hydraulic fracturing pump or drive a generator as part of a gen-set. These environmental conditions may lead to the air being less dense. One skilled in the art will appreciate that the relative density of air may be an important factor for a turbine as turbine mass air flow through the air intake axial compression stages may be directly proportional to the turbine's performance output. The air treatment system 10 described herein may allow for the selective conditioning of air, which may affect a desired increase in air density of air entering the intake of the turbine. As described in more detail below, the air treatment module 30 and/or the at least one air conditioning module 70 of the air treatment system may filter air entering the air treatment system, may boost the pressure of air entering the air treatment system, and may lower the temperature of the air entering the air treatment system air to increase the operating efficiency of the turbine.

As illustrated, the example housing 20 may be configured to channel an airstream towards the inlet assembly of the turbine and may be positioned upstream of the input side of the turbine, which channels the airstream to the compressor. The housing 20 may have a shape that is configured for allowing for structural integration with the inlet assembly of the turbine. The integration of the inlet assembly of the turbine and the housing may allow for more controlled flow of the airstream flowing through the air treatment module 30 and the air conditioning module 50 and then flowing to the inlet assembly of the turbine. The housing 20 may be joined to the inlet assembly of the turbine via a plurality of connection means, such as, but are not limited to, welding, bolting, other fastening methods, or combinations thereof. The housing 20 may be formed of or include any material(s) capable of supporting the air treatment module and/or the air conditioning module. Such material(s) may include, for example, but are not limited to, a metal, an alloy, and/or other structural materials as will be understood by those skilled in the art.

The air treatment module 30 may include a plurality of inlet air filters or pre-cleaners 32 and at least one blower fan 35 configured to pressurize air. In some embodiments, the air treatment module 30 may be positioned at a proximal end 22 of the housing 20. The plurality of inlet air filters 32 may be in fluid communication with a first internal chamber 34 of the air treatment module, and the at least one blower fan 35 may be mounted in the first internal chamber 34 to pressurize air entering the first internal chamber 34 via the plurality of inlet air filters. In some embodiments, it is contemplated that plurality of inlet air filters may knock down debris, including mud, snow, rain, leaves, sawdust, chaff, sand, dust, and the like. As shown, the inlet air filters 32 may be configured to continuously or intermittently eject debris before reaching an optional filter module 70 that may be mounted internally within the housing, for example, without the need for further cleaning or shutting-down the unit to replace one or more of the plurality of inlet air filters.

As one skilled in the art will appreciate, to compensate for the pressure drop through the plurality of inlet air filters and to boost the pressure and flow of the air to the turbine, the at least one blower fan 35, which may be operated by an electrical or hydraulic motor, may be installed to bring the overall airflow up to a desired air feed rate, such as, for example and without limitation, about 28,000 CFM, to increase the inlet pressure at the inlet of the turbine with a resultant increase in efficiency of the turbine. Without limitation, in the schematic example shown in FIG. 1, at least one blower fan 35 with a coupled electrical motor may be positioned in the first internal chamber 34 of the air treatment module to boost the pressure of intake air to a desired level after the pressure drop through the plurality of inlet air filters and into the downstream filter module 70. For example, the at least one blower fan 35 may be a squirrel cage blower fan. However, and without limitation, other conventional electrically or hydraulically powered blower fans, such as vane axial fans, and the like, are contemplated. Optionally, the air treatment system 10 may be integrated with a bypass. The bypass may reduce the pressure drop derived from a non-operating air conditioning system.

It is contemplated that the at least one blower fan 35 may pressurize the air exiting the air treatment module to a degree sufficient to at least partially overcome the pressure losses associated with passing through the upstream plurality of air filters 32 and through the downstream air conditioning module 50 and, if used, a downstream filter module 70 positioned upstream of the at least one conditioning module, and any other losses the system may encounter, such as rarefication of the inlet air to the blower. In such embodiments, the downstream filter module 70 may be a conventional high-efficiency filter, such as, and without limitation, a conventional vane inlet with a low cartridge- or bag-type pre-filter that would be suitable for periodic cleaning and changing.

It is contemplated that the at least one blower fan 35 may be oversized to allow for further pressurization of the air at the downstream inlet of the turbine or engine. Oversizing may allow for suitable compensation for the loss of atmospheric pressure and air density, for example, with increased elevation. The change in pressure due to a change in elevation may be calculated via the following equation:

$$P = P_b \left[ \frac{T_b}{T_b + L_b(H - H_b)} \right]^{\frac{g_0 M}{R^* L_b}}$$

where:
P=local atmospheric pressure;
$P_b$=static pressure at sea level;
$T_b$=temperature at sea level;
$L_b$=temperature lapse rate;
$H_b$=elevation at sea level;
H=local elevation;
R*=universal gas constant;
$g_0$=gravity; and
M=molar mass of air.

Figure 3:
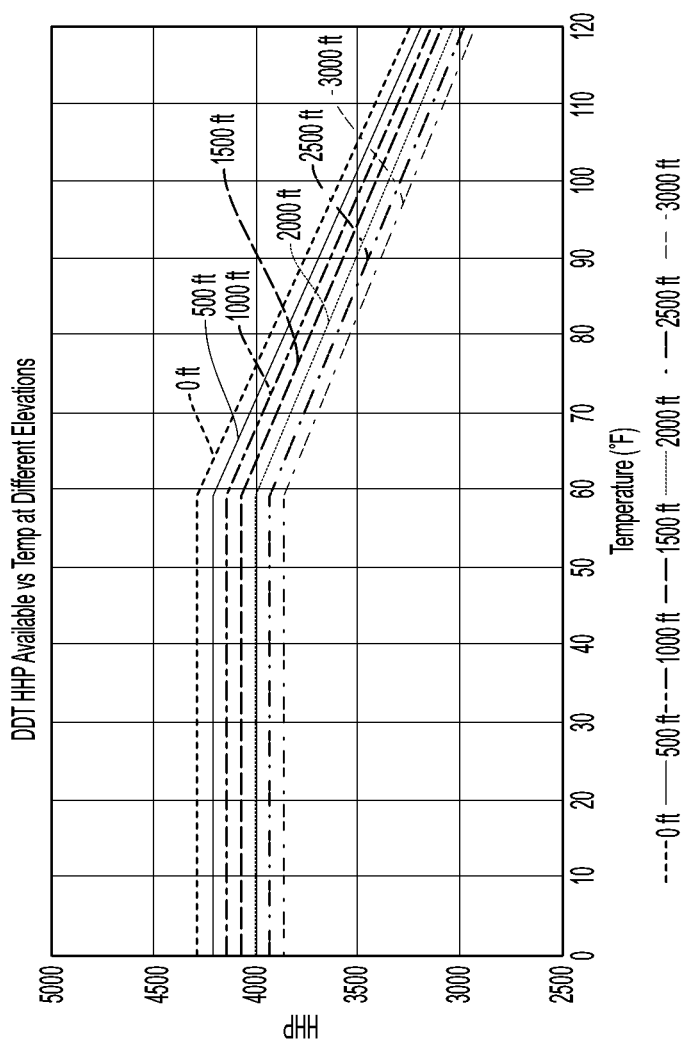
FIG. 3 illustrates example performance loss of the gas turbine with increased temperature according to an embodiment of the disclosure.

From the calculated pressure, the ideal gas law may be used to calculate a new density of the air at the constant atmospheric pressure. FIG. 3 shows the change in pressure as a function of increased elevation. It also shows the calculated density in reference to temperature change and elevation change.

$$\rho = \frac{p}{R_{sp}T}$$

where:
P=absolute pressure;
ρ=density;
T=absolute temperature; and
$R_{SP}$=specific gas constant.

Referring now to FIG. 4, the conventional factor for performance loss of the turbine with increased temperature is a 0.4% to about 0.5% reduction in performance for every one degree Fahrenheit increase over 59 degrees F. For example, it may be seen that at 500 ft, dropping the temperature from 100 degrees F. to 90 degrees F., the HHP output will increase by 140 horsepower, or about 4%.

The increase in power results from the temperature decreasing and holding the air pressure constant. The ideal gas law equation may be used to calculate the density of the air as a function of the change in temperature. As may be seen from the table illustrated in FIG. 4, a decrease to 90 degrees F. from 100 degrees F. will result in a density increase of 0.0013 lbm/ft³ or a 1.8% increase. The described relationship is that for every percentage of air density increase the output efficiency increases by approximately 2.2%.

Referring to FIGS. 1 and 2, the first internal chamber 34 of the air treatment module 30 is in fluid communication with an interior chamber 24 of the housing via at least one outlet 39 of the air treatment module. Optionally, the air treatment module 30 may further include a plurality of drift eliminator and/or coalescer pads suitable for reducing the content of liquids within the airstream flowing through the air treatment module.

The at least one air conditioning module 50 for adjusting the temperature of the airstream passing thorough the housing and toward the input side of the gas turbine may be mounted downstream of the air treatment module 30. The airstream enters the at least one air conditioning module 50 at a first temperature and exits the air conditioning module at a second temperature. The at least one air conditioning module 50 may have a conventional form such as a chiller. One skilled in the art will appreciate that other forms of conventional air conditioning modules are contemplated. The specific form of the at least one air conditioning module may be determined in part from the configuration of the gas turbine.

In some embodiments, the at least one conditioning module 50 may include at least one chiller module 55. The chiller module 55 may include a conventional arrangement of a plurality of condenser coils 56 disposed in the housing and that are configured to span the substantial width of the housing, such that the airstream passes through and/or around the plurality of condenser coils 56 to effect a desired lowering of the temperature of the airstream that is directed downstream toward the input side of the gas turbine. The plurality of condenser coils 56 may be in communication with a source of pressurized chilled refrigerant. The refrigerant may be any conventional refrigerant, such as, without limitation, R22, R410a, and the like as will be understood by those skilled in the art. In one example, the refrigerant fluid may be cooled to about 45 degrees F., but it is contemplated that the desired coolant temperature may be changed to suit varying operating conditions as desired.

It is contemplated that the at least one air conditioning module 50 may decrease the temperature of the airstream entering the inlet assembly of the gas turbine to increase the efficiency and power output. In one exemplary aspect, the at least one conditioning module 50 may preferably decrease a temperature of the airstream by between about 2 and 20 degrees F. and optionally between about 5 and 10 degrees F. In some applications, increasing the efficiency and/or the power output of the gas turbine may lead to more efficient operations. For example, in a hydraulic fracturing operation including a plurality of hydraulic fracturing units, each operating a gas turbine to supply power to drive fracturing pumps, such increases in efficiency and/or power output may facilitate reducing the number the gas turbines operating, while still providing sufficient power to meet fracturing fluid pressure and/or flow rate needs to complete the fracturing operation.

In various exemplary aspects, it is contemplated that, in elevational cross-sectional view, the plurality of condenser coils 56 of the chiller module 55 may have a planar shape, a W shape, a V shape, or other geometric shape. The chiller module 55 may further comprise a means for chilling the source of pressurized chilled refrigerant. The means for chilling the source of pressurized chilled refrigerant may be a conventional refrigeration cycle using a compressor 58 that is configured to supply pressurized chilled refrigerant to the plurality of coils. The compressor may include a plurality of compressors, which may include one or more of the following types of compressors: a reciprocating compressor, a scroll compressor, a screw compressor, a rotary compressor, a centrifugal compressor, and the like.

Optionally, the means for chilling the source of pressurized chilled supply may include at least one chill line carrying pressurized refrigerant that may be routed through and/or around a cold source. It is contemplated that the cold source may include at least one gas source in liquid form.

Optionally, the plurality of condenser coils 56 may be placed in an existing radiator package where the lube coolers and engine coolers for the gas turbine are housed. It is also optionally contemplated that the plurality of condenser coils 56 may be packaged along with the compressor and an expansion valve of a conventional refrigeration cycle system. It is contemplated that the heat rejection requirement of the plurality of condenser coils 56 may be higher than the heat rejection of the evaporator because the plurality of condenser coils 56 must also reject the heat load from the coupled compressors.

Figure 5:
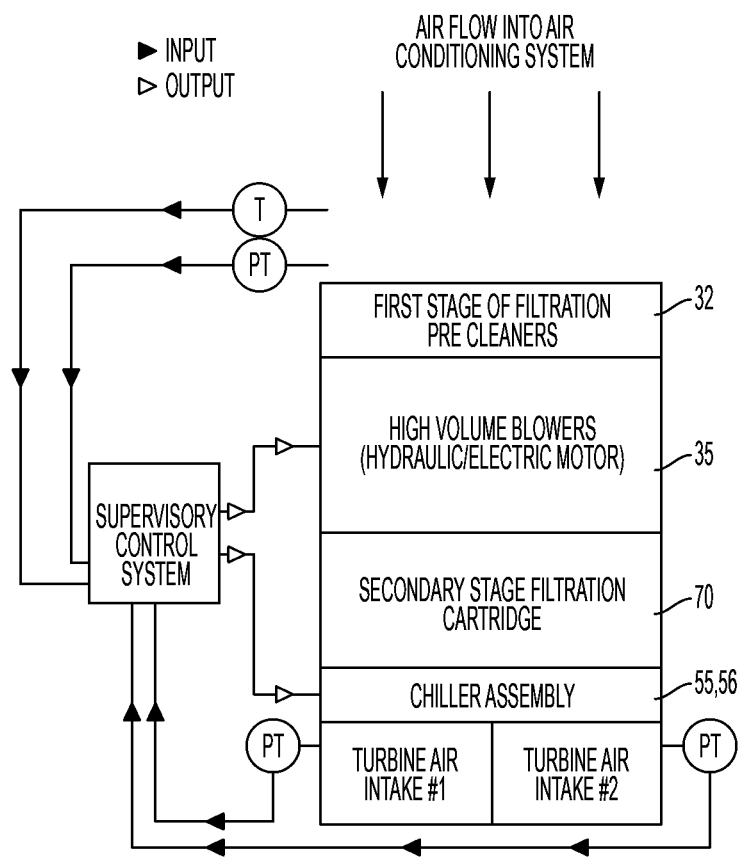
FIG. 5 is a schematic diagram of an example of an electrical system for operating the air treatment system according to an embodiment of the disclosure.
Figure 6:
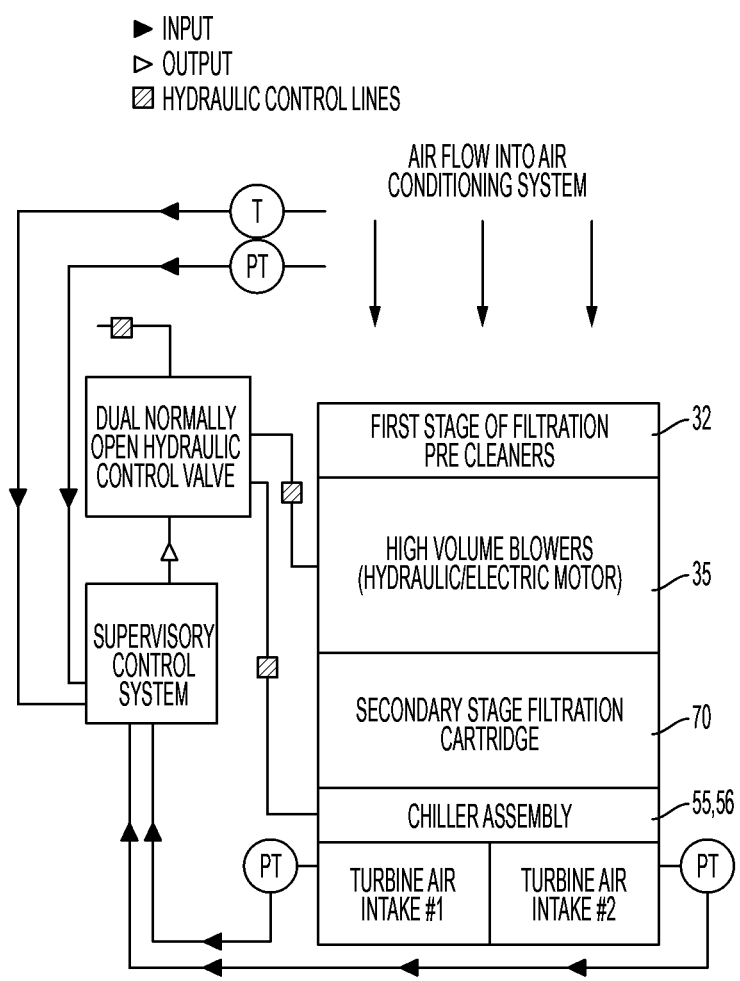
FIG. 6 is a schematic diagram of an example of a hydraulic system for operating the air treatment system according to an embodiment of the disclosure.

Referring now to FIGS. 5 and 6, schematic diagrams of an electrical system and a hydraulic system for operating the air treatment system are presented. It is contemplated that the air conditioning system 10 will not actuate the air treatment module 30 and at least one air conditioning module 50 at a constant speed or power output. For example, during a cold day with low humidity and at low elevation, the air conditioning system may only utilize the plurality of inlet air filters or pre-cleaners 32 and the optional filter module 70. In some embodiments consistent with this example, the at least one blower fan 35 may be selectively engaged to ensure the pressure drop across the inlet air filters or pre-cleaners 32 are within the turbine manufacturer's guidelines, but the at least one blower fan 35 will not be run at the respective blower fan's cubic feet per minute (cfm) rating, nor will the at least one air conditioning module 50 be attempting to reduce the temperature of the air to an unnecessary temperature. As illustrated, the example air treatment module 30 and at least one air conditioning module 50 may be selectively controlled via proportional motor control that may be operatively configured to function through a combination of the use of programmable VFDs, a PLC control system, an instrumentation and hydraulic control system, and the like.

In some embodiments, ISO conditions of 59 degrees F., 14.696 pounds per square inch atmospheric pressure, at sea level, and 60% relative humidity may be the baseline operating levels for control of the air conditioning system 10, as these are the conditions that are used to rate a turbine engine for service. As shown in FIG. 5, the assembly and implementation of instruments such as atmospheric pressure sensors and/or temperature sensors allow the air conditioning system 10 to monitor air density through the data inputs and to calculate, at a desired sample rate, the density in reference to temperature change and elevation change. Further, it is contemplated that the pressure drop through the plurality of inlet air filters or pre-cleaners 32 may be monitored via a pair of pressure sensors, which may be positioned at the air intake of the plurality of inlet air filters or pre-cleaners 32 and at the air intake of the turbine also. This noted pressure differential between the pair of pressure sensors may allow the air conditioning system 10 to command the operation of the plurality of blower fans 35 to operate at a desired speed to mitigate or overcome the sensed pressure drop.

It is contemplated that in the event there is a loss of one or more control signals from the supervisory control system of the air conditioning system 10, the chillers and blowers may be configured to automatically revert to operation at maximum output as a failsafe and/or to ensure that operation of the coupled turbine is not ceased. During operation, the pressure transducers and temperature transducers may be configured to provide continuous or intermittent feedback to the supervisory control system. As described, during normal operation according to some embodiments, the supervisory control system may operate to detect the deficiency of the inlet airstream, such as a temperature and/or pressure drop, and may be configured to send control outputs to the blower fan motors and/or the at least one air conditioning module 50, for example, to condition the airstream to mitigate or overcome the environmental losses. For example, and without limitation, the supervisory control system may include, but is not limited to, PLC, micro-controllers, computer-based controllers, and the like as will be understood by those skilled in the art.

Similarly, FIG. 6 illustrates an example use of hydraulic power to turn hydraulic motors on the blower fans 35 (if hydraulically-powered blower fans 35 are used) and the hydraulically-powered fans on the at least one air conditioning module 50 (if used). In such embodiments, proportional hydraulic control valves may be positioned and may be configured to receive operational input from the supervisory control system for the selective operation of a spool to ensure that the correct amount of hydraulic fluid is delivered into the air conditioning system.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

What is claimed is:

1. An air treatment system to increase the efficiency of a gas turbine comprising an inlet assembly and a compressor, the inlet assembly located upstream of the compressor and forming an input side of the gas turbine, the air treatment system comprising:
   a housing positioned to channel an airstream towards the inlet assembly, the housing positioned upstream of the input side, which channels the airstream to the compressor; and
   an air treatment module positioned at a proximal end of the housing, the air treatment module comprising:
      a plurality of inlet air filters to provide fluid flow to a first internal chamber, and
      one or more blowers mounted in the first internal chamber and providing fluid flow to an interior of the housing via at least one outlet of the first internal chamber, the one or more blowers configured to pressurize the air entering the air treatment module, and
      one or more air conditioning modules mounted downstream of the air treatment module for adjusting the temperature of the airstream entering the compressor, such that the airstream enters the one or more air conditioning modules at a first temperature and exits the one or more air conditioning modules at a second temperature.

2. The air treatment system of claim 1, wherein the one or more air conditioning modules comprise at least one chiller module.

3. The air treatment system of claim 2, wherein the at least one chiller module comprises a plurality of condenser coils in flow communication with a source of pressurized chilled refrigerant.

4. The air treatment system of claim 3, wherein the refrigerant comprises one or more of R22 or R410a.

5. The air treatment system of claim 3, wherein the plurality of condenser coils may have one or more of a planar shape in elevational cross-section, a W shape in elevational cross-section, or a V shape in elevational cross-section.

6. The air treatment system of claim 3, further comprising one or more of a refrigeration cycle including compressor configured to supply pressurized chilled refrigerant to a plurality of coils, or one or more chill lines carrying pressurized refrigerant.

7. The air treatment system of claim 2, wherein the at least one chiller module has at least one chill line that may be routed through a cold source.

8. The air treatment system of claim 7, wherein the cold source comprises at least one gas source in liquid form.

9. The air treatment system of claim 2, wherein the at least one chiller module further comprises a compressor in fluid commination with a plurality of coils.

10. The air treatment system of claim 1, wherein the one or more air conditioning modules are configured to decrease a temperature of the airstream.

11. The air treatment system of claim 1, wherein the one or more air conditioning modules are configured to decrease a temperature of the airstream by an amount ranging from about 2 degrees F. to about 20 degrees F.

12. The air treatment system of claim 1, wherein the air treatment system further comprises a filter positioned upstream of the one or more air conditioning modules.

13. A hydraulic fracturing unit comprising:
   a trailer;
   a hydraulic fracturing pump to pump fracturing fluid into a wellhead, the hydraulic fracturing pump connected to the trailer;
   a gas turbine to drive the hydraulic fracturing pump; and
   an air treatment system to increase the efficiency of the gas turbine, the gas turbine comprising an inlet assembly and a compressor, the air treatment system comprising:
      a housing positioned to channel an airstream towards the inlet assembly; and
      an air treatment module positioned at a proximal end of the housing, the air treatment module comprising:
         a plurality of inlet air filters to provide fluid flow to a first internal chamber, and
         one or more blowers mounted in the first internal chamber and providing fluid flow to an interior of the housing via at least one outlet of the first internal chamber, the one or more blowers positioned to pressurize air entering the air treatment module, and
         one or more air conditioning modules mounted downstream of the air treatment module to adjust the temperature of the airstream entering the compressor, such that the airstream enters the one or more air conditioning modules at a first temperature and exits the one or more air conditioning modules at a second temperature.

14. The hydraulic fracturing unit of claim 13, wherein the one or more air conditioning modules comprise at least one chiller module.

15. The hydraulic fracturing unit of claim 14, wherein the at least one chiller module comprises a plurality of condenser coils in flow communication with a source of pressurized chilled refrigerant.

16. The hydraulic fracturing unit of claim 15, wherein the refrigerant comprises one or more of R22 or R410a.

17. The hydraulic fracturing unit of claim 15, wherein the plurality of condenser coils may have one or more of a planar shape in elevational cross-section, a W shape in elevational cross-section, or a V shape in elevational cross-section.

18. The hydraulic fracturing unit of claim 15, further comprising one or more of a refrigeration cycle including compressor configured to supply pressurized chilled refrigerant to a plurality of coils, or one or more chill lines carrying pressurized refrigerant.

19. The hydraulic fracturing unit of claim 14, wherein the at least one chiller module has at least one chill line that may be routed through a cold source.

20. The hydraulic fracturing unit of claim 19, wherein the cold source comprises at least one gas source in liquid form.

21. The hydraulic fracturing unit of claim 14, wherein the at least one chiller module further comprises a compressor in fluid commination with a plurality of coils.

22. The hydraulic fracturing unit of claim 13, wherein the air treatment system further comprises a filter positioned upstream of the one or more air conditioning modules.

23. A method to enhance the efficiency of a gas turbine comprising an inlet assembly and a compressor, the method comprising:
    causing an airstream to flow toward the inlet assembly;
    passing the airstream through a plurality of inlet air filters to a first internal chamber;
    operating one or more blowers to pressurize the airstream and provide fluid flow to an interior of a housing via at least one outlet of the first internal chamber;
    causing the airstream to enter one or more air conditioning modules at a first temperature and exit the one or more air conditioning modules at a second temperature.

24. The method of claim 23, wherein causing the airstream to enter the one or more air conditioning modules comprises reducing a temperature of the airstream from the first temperature to the second temperature.

25. The method of claim 23, wherein causing the airstream to enter the one or more air conditioning modules comprises causing the airstream to enter at least one chiller module.

26. The method of claim 25, wherein causing the airstream to enter at least one chiller module comprises causing the airstream to one or more of pass through or pass around a plurality of condenser coils in flow communication with a source of pressurized chilled refrigerant.

27. The air treatment system of claim 1, wherein one or more of the one or more blowers is oversized to allow for further pressurization of the air entering the air treatment module.

28. The air treatment system of claim 1, further comprising:
    a first temperature sensor disposed near the plurality of inlet air filters or the one or more blowers, the first temperature sensor to measure the first temperature;
    a second temperature sensor dispose near an exit of the one or more air conditioning modules, the second temperature sensor to measure the second temperature;
    a first pressure transducer disposed before inlets of the one or more blowers, the first pressure transducer to measure the pressure of air flowing into the one or more blowers;
    a second pressure transducer disposed after outlets of the one or more blowers, the second pressure transducer to measure the pressure of air flowing out of the one or more blowers; and
    a controller in signal communication with the first temperature sensor and the second temperature sensor to receive the first temperature and the second temperature, respectively, and in signal communication with the first pressure transducer and the second pressure transducer to receive the pressure of air flowing into the one or more blowers and the pressure of air flowing out of the one or more blowers, the controller to determine a pressure drop across the one or more blowers based on the pressure of air flowing into the one or more blowers and the pressure of air flowing out of the one or more blowers.

29. The air treatment system of claim 28, wherein the controller is in signal communication with the one or more air conditioning modules, to control operation of the one or more air conditioning modules, and, based on the first temperature and the second temperature, the controller operating the one or more air conditioning modules to adjust the temperature of the airstream by a determined temperature.

30. The air treatment system of claim 28, wherein the controller is in signal communication with the one or more blowers, to control operation of the one or more blowers, and, based on the pressure drop across the one or more blowers and a turbine manufacturer's guidelines, the controller operating the one or more blowers to adjust the pressure of the airstream by a determined amount.

* * * * *